United States Patent [19]

Sheldon

[11] Patent Number: 5,388,935
[45] Date of Patent: Feb. 14, 1995

[54] SIX AXIS MACHINE TOOL

[75] Inventor: Paul C. Sheldon, Mequon, Wis.

[73] Assignee: Giddings & Lewis, Inc., Fond du Lac, Wis.

[21] Appl. No.: 100,954

[22] Filed: Aug. 3, 1993

[51] Int. Cl.$^6$ .......................... B23C 1/06; B25J 11/00
[52] U.S. Cl. ..................................... 409/201; 248/631;
  408/234; 409/145; 409/211; 409/216; 409/235;
  901/22; 901/23
[58] Field of Search ............... 409/235, 211, 201, 183,
  409/204, 212, 216, 164, 145; 248/631, 371, 348,
  652–654; 74/479; 408/234, 236; 414/735;
  901/22, 23; 29/36, 39, 50

[56] References Cited

U.S. PATENT DOCUMENTS

| | | |
|---|---|---|
| Re. 27,051 | 2/1971 | Cappel . |
| 2,823,591 | 2/1958 | Craddock et al. . |
| 3,037,286 | 6/1962 | Bower et al. . |
| 3,577,659 | 5/1971 | Kail . |
| 3,596,153 | 7/1971 | Brainard et al. . |
| 3,683,747 | 8/1972 | Pettit . |
| 4,280,285 | 7/1981 | Haas . |
| 4,343,610 | 8/1982 | Chou . |
| 4,360,182 | 11/1982 | Titus . |
| 4,364,540 | 12/1982 | Montabert . |
| 4,407,625 | 10/1983 | Shum . |
| 4,512,695 | 4/1985 | Brun et al. . |
| 4,536,690 | 8/1985 | Belsterling et al. . |
| 4,556,957 | 12/1985 | Ichikawa . . |
| 4,569,627 | 2/1986 | Simunovic . |
| 4,576,577 | 3/1986 | Lam et al. . |
| 4,578,763 | 3/1986 | Jones et al. . |
| 4,621,926 | 11/1986 | Merry et al. . |
| 4,645,084 | 2/1987 | Deike . |
| 4,651,589 | 3/1987 | Lambert . |
| 4,723,460 | 2/1988 | Rosheim . |
| 4,753,596 | 6/1988 | Hart et al. . |
| 4,776,749 | 10/1988 | Wazenberg et al. . |
| 4,806,068 | 2/1989 | Kohli et al. . |
| 4,819,496 | 4/1989 | Shelef . |
| 4,858,301 | 8/1989 | Galarowic .................. 29/564 X |
| 4,988,244 | 1/1991 | Sheldon et al. . |
| 5,028,180 | 7/1991 | Sheldon et al. . |
| 5,259,710 | 11/1993 | Charles ................. 409/235 |
| 5,354,158 | 10/1994 | Sheldon et al. . |

FOREIGN PATENT DOCUMENTS

| | | |
|---|---|---|
| 109201 | 5/1984 | European Pat. Off. . |
| 202206 | 11/1986 | European Pat. Off. . |
| 2063433 | 7/1971 | France . |
| 2540984 | 3/1977 | Germany . |
| 8301746 | 12/1987 | Germany . |
| 2083795 | 3/1982 | United Kingdom . |
| 2173472 | 10/1986 | United Kingdom . |
| 2179605 | 3/1987 | United Kingdom . |
| 1049244 | 10/1983 | U.S.S.R. . |
| 1194672 | 11/1985 | U.S.S.R. . |
| 1222538 | 4/1986 | U.S.S.R. . |
| 1224137 | 4/1986 | U.S.S.R. . |
| 1296401 | 3/1987 | U.S.S.R. . |

OTHER PUBLICATIONS

"Milling With Universal Spindles", American Machinist, Jun., 1989.

"A Platform With Six Degrees of Freedom", D. Stewart, The Institute of Mechanical Engineers, Proceedings 1965–1966, pp. 371–394.

"Universal Tyre Test Machine", V. E. Gough & S. G. Whitehall Proceedings, Ninth International Technical Congress F.I.S.I.T.A. May 1962, pp. 117–137.

*Primary Examiner*—William Briggs

[57] ABSTRACT

A machine such as a machine tool includes a pair of spaced platforms. One platform may mount an operator such as a tool in a spindle, and the other platform may mount an object such as a workpiece. The spaced platforms are joined by six powered and extensible legs joined to the respective platforms by universal joints. The length of the legs is individually manipulated to vary the positions of the platforms and, therefore, the object and operator relative to each other. Four of the legs are arranged into two pairs which are spaced apart to provide between them a part of a corridor for moving the workpiece into a working position. The two legs in each pair may cross each other. The other two legs extend away from each other and provide another part of the corridor between their inboard ends.

11 Claims, 4 Drawing Sheets

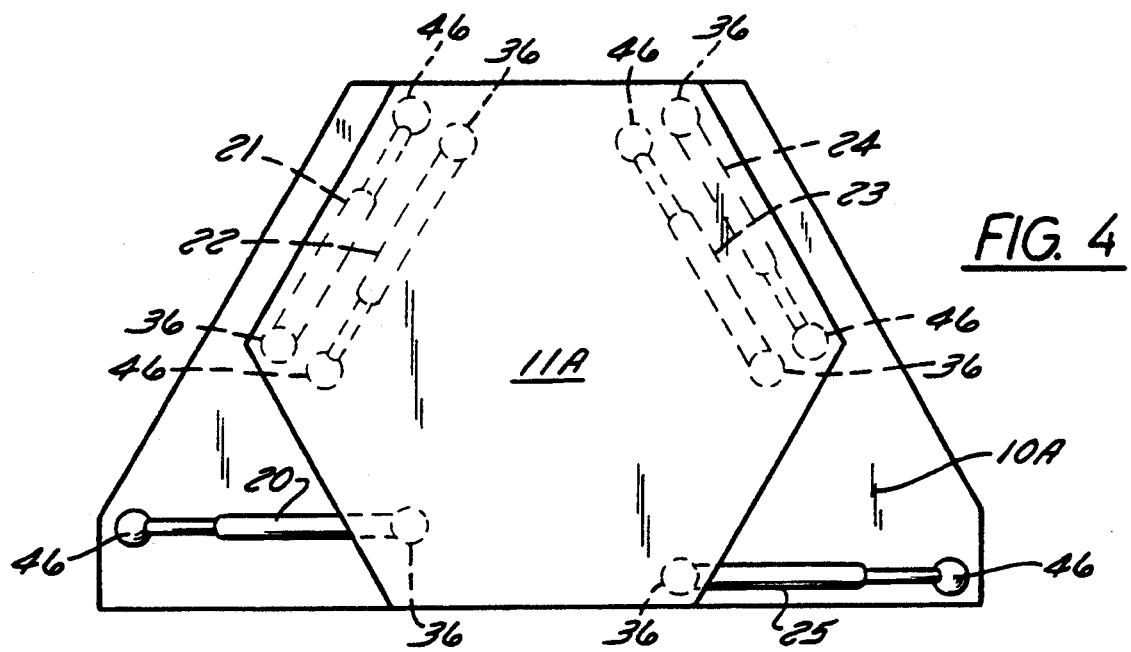
FIG. 4
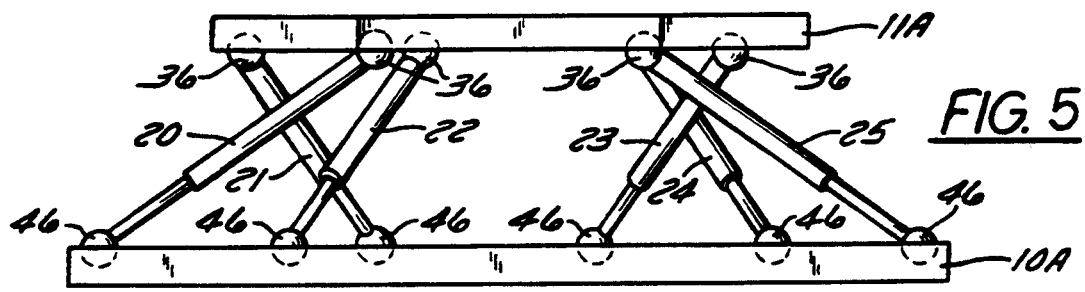
FIG. 5
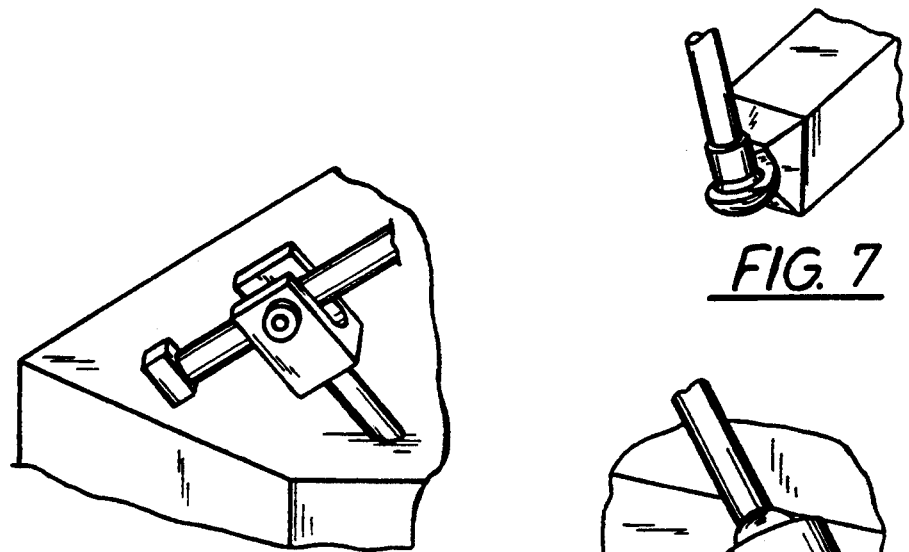
FIG. 6
FIG. 7
FIG. 8

SIX AXIS MACHINE TOOL

BACKGROUND OF THE INVENTION

This invention relates to a machine for locating an operator with respect to an object and more particularly to a versatile machine tool in which the tool can be moved in three lineal directions and three rotational directions in relation to the surface of a workpiece.

Until recently, the most versatile form of cutting tool type machine tool was the so-called machining center which typically included a bed supporting a rotary table, an upright column and a spindle head carried by the column. Such a machining center can accomplish milling, drilling, boring and tapping operations in up to six axes of motion. Doing this requires that the movements of its table, column, spindle head, spindle and bed be coordinated and that the sometimes massive components be moved in very controllable finite increments. Although this type of modern machining center can provide very accurate machining, it becomes very complex and expensive when it is designed to provide maximum versatility.

In response to these problems, there was developed a different apparatus for locating a tool or another type of operator relative to a workpiece or other object. The apparatus employs a pair of spaced platforms, one of which may mount an operator such as a tool and the other may mount an object such as a workpiece. The spaced platforms are joined by six extensible legs, whose length may be individually manipulated to vary the position of the platforms and, therefore, the object and operator relative to each other in six axes. The legs may be powered. For example, they may be hydraulically driven cylinders or may be driven by a recirculating-ball screw. Applicants hereby incorporate by reference U.S. Pat. Nos. 4,988,244, Sheldon et al., Jan. 29, 1991 and 5,028,180, Sheldon, et al., Jul. 2, 1991, and PCT International Application Number PCT/US90/04797 published Mar. 21, 1991 under International Publication Number WO91/03145 ("the incorporated patent documents"). The incorporated patent documents disclose the inventions referred to in this paragraph.

One possible limitation to the versatility of the six-legged positioner is that it tends to impede easy movement of a workpiece onto the workpiece-holding platform and to restrict the size of the workpiece.

SUMMARY OF THE INVENTION

The object of the invention is to improve the six-legged positioner by facilitating easier access of the object or workpiece into an operating position and to allow larger workpieces and other objects to be handled, while substantially retaining the advantages described herein and in the incorporated patent documents.

While the description herein is primarily in terms of a machine tool, the invention is not limited to a machine tool. In addition to machine tool applications, the invention may be employed for locating an operator of any sort relative to an object of any kind and for joining spaced platforms.

In a preferred embodiment, there are a pair of spaced supports, such as platforms. The tool is located with respect to one of the supports, and the workpiece is located with respect to the other of the supports. There are six leg members. Each leg member is joined at a first point to one of the supports and is joined to the other support at a second point that is spaced along the leg member from the first point. The junctions of four of the leg members with the supports are located so that the four leg members are arranged into two pairs which are spaced apart to provide between the pairs a portion of a corridor for moving the workpiece into a working position. In one aspect, the leg members in each pair cross each other. The junctions of the other two leg members with the supports are located so that the two leg members extend away from each other and provide another portion of the corridor between the inboard points of the other two leg members. Means are provided for individually manipulating at least certain of the leg members to vary the position of the points of such leg members relative to each other.

Thus, the present invention offers the advantages of allowing a larger workpiece to be conveniently moved into working position and of providing a corridor which may, for example, be occupied by a conveyor or a track on which a workpiece can be moved into working position, machined and moved out of the other end of the machine. The invention achieves these advantages while substantially retaining the advantages of the apparatus and methods of the six legged positioner.

These and other objects and advantages of the invention will be apparent from the description which follows. The preferred embodiments will be described in reference to the accompanying drawings. These embodiments do not represent the full scope of the invention, but rather the invention may be employed in other embodiments.

BRIEF DESCRIPTION OF THE DRAWINGS

FIG. 4 is a top plan view of a second embodiment in accordance with the invention;

FIG. 5 is a view in elevation of the embodiment of FIG. 4;

FIGS. 6–8 illustrate types of joints for mounting legs to platforms; and

DESCRIPTION OF THE PREFERRED EMBODIMENTS

Figure 1:
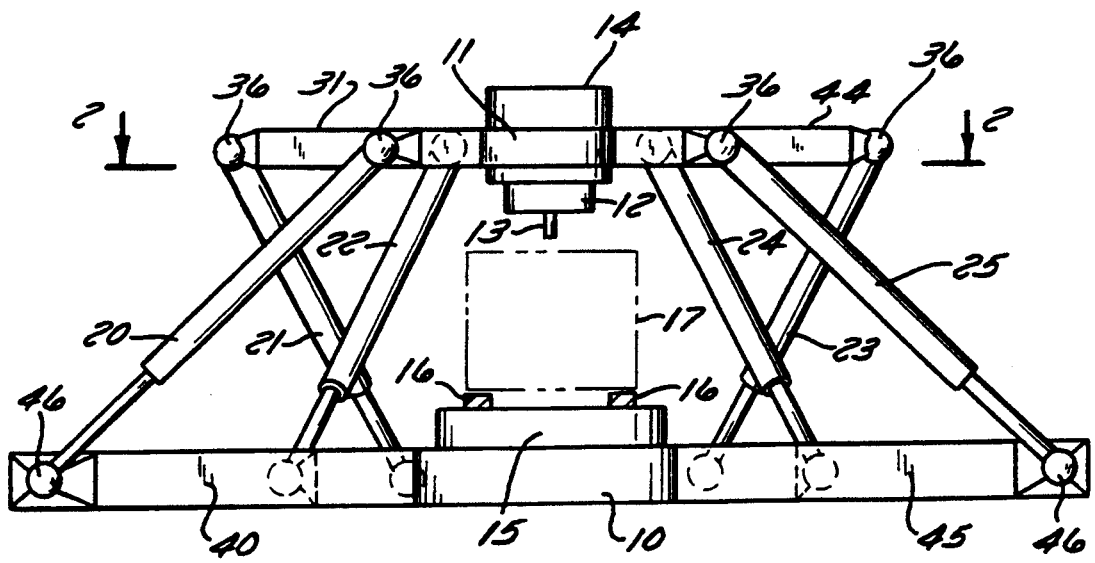
FIG. 1 is a view in elevation of one embodiment of a machine tool in accordance with the invention.
Figure 2:
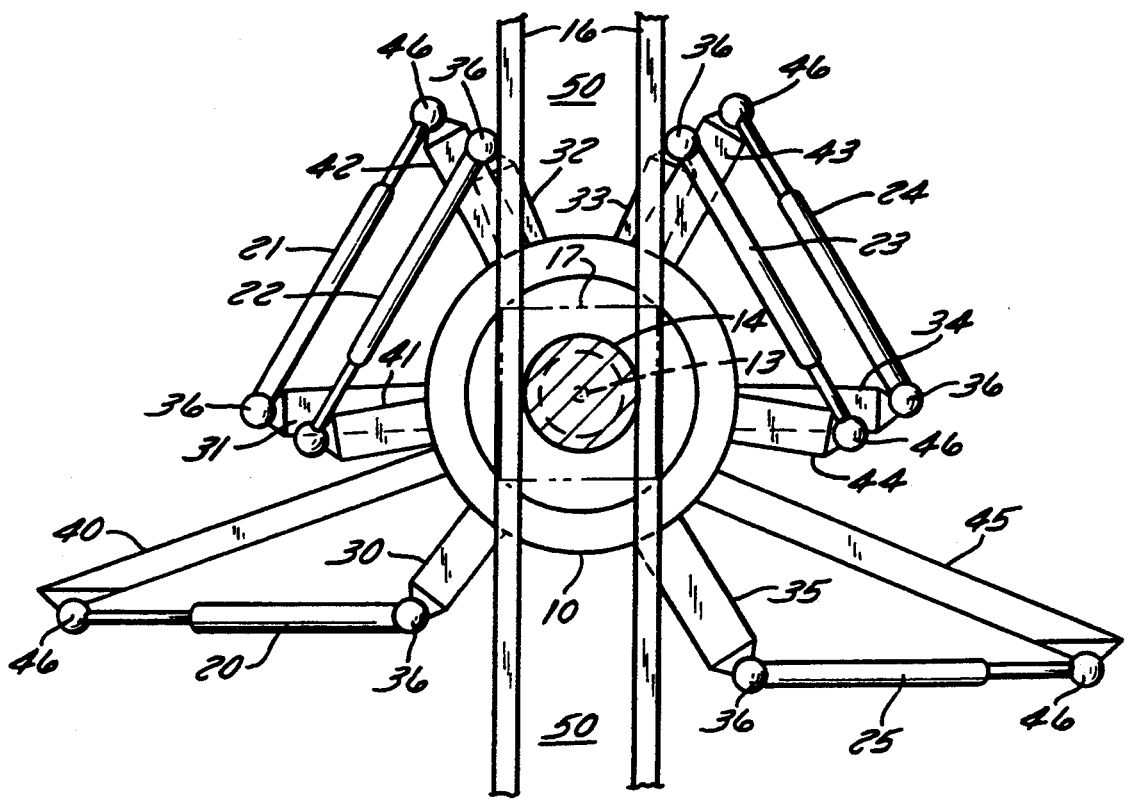
FIG. 2 is a top plan view along line 2—2 of FIG. 1.
Figure 3:
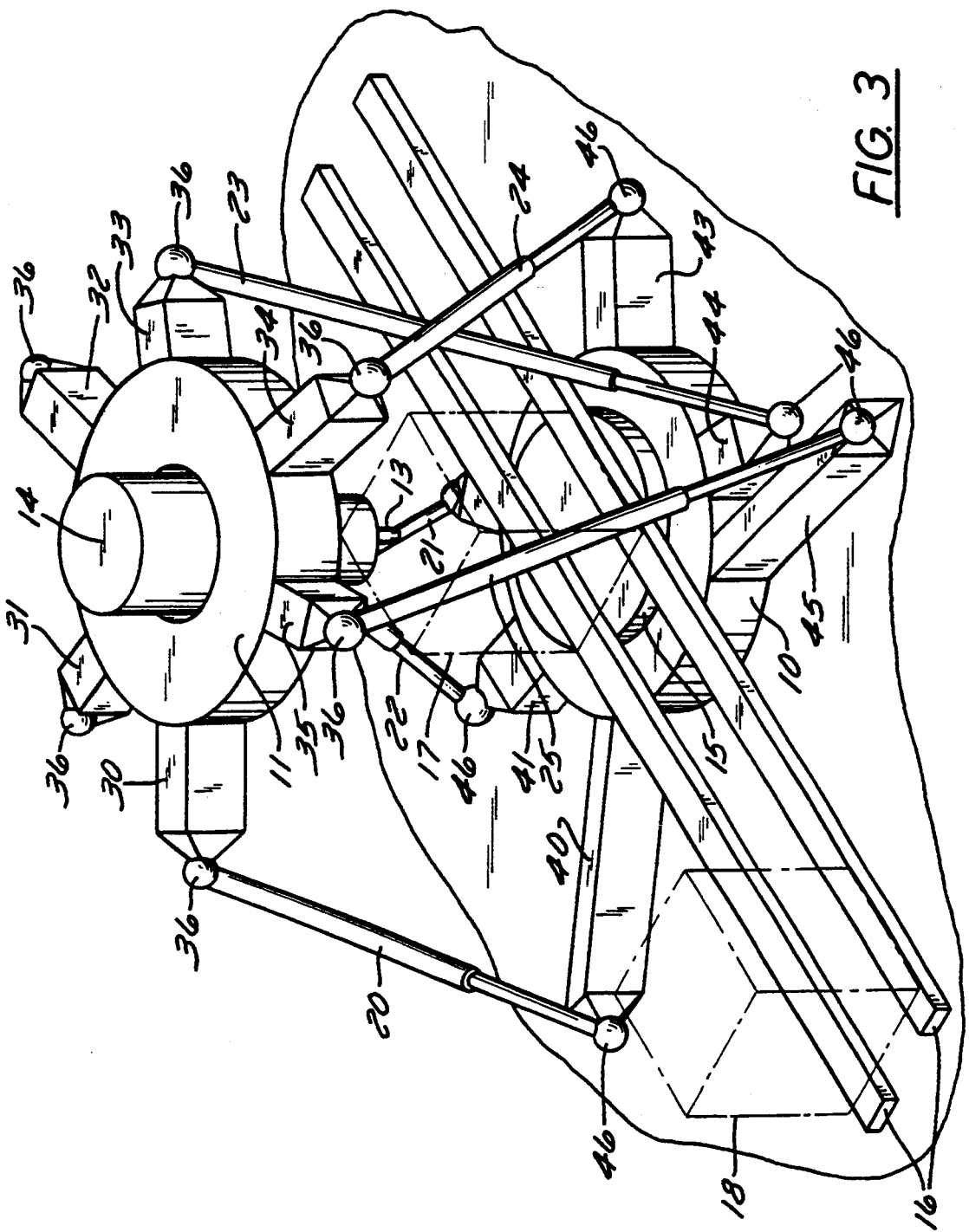
FIG. 3 is a view in perspective of the machine tool of FIG. 1.

FIGS. 1–3 illustrate a preferred embodiment of a machine tool according to the present invention. It has a base 10 in the nature of a support or platform and a spindle support or platform 11 spaced from the base 10. A spindle head 12 is mounted on the spindle platform 11 and is adapted to receive a rotating cutting tool 13. A spindle drive assembly indicated generally by the numeral 14 is mounted on the spindle platform 11 and it includes a motor and power train (not shown) which power the cutting tool 13 in the usual manner. The base platform 10 carries an elevated platform or workpiece support 15 which in turn supports a workpiece conveyance means, such as a pair of tracks 16, over which a workpiece 17 has been moved into position. As shown in FIG. 3, a second workpiece 18 is next in line on tracks 16. The platforms 10 and 11 are spaced apart and joined together by six powered and extensible legs 20–25, which are described below.

The spindle support 11 is in the form of a ring from the periphery of which extend six upper arms 30–35. The upper arms 30–35 may vary in length, need not be radial and need not be equally spaced around the periphery of spindle support 11. At the end of each of the upper arms 30–35 is a means 36 (described below) for mounting the upper end of one of the legs 20–25.

Similarly, base 10 is in the form of a ring from the periphery of which extend six lower arms 40–45. These may be of different lengths, need not be equally spaced and need not be radial. At the end of each of the lower arms 40–45 is a means 46 (described below) for mounting the lower end of a leg 20–25.

Four of the upper arms 30–35 and four of the lower arms 40–45 are located and their lengths are determined so that when legs are connected to them there will be an overlapping and crossing pair of legs on either side of tracks 16. One pair consist of legs 23 (connected to arms 33 and 44) and 24 (connected to arms 34 and 43), and the other pair consists of legs 21 (connected to arms 31 and 42) and 22 (connected to arms 32 and 41). These two pairs of legs are spaced apart and define a part of a corridor 50 for the tracks 16 and workpieces 17 and 18.

If the remaining legs (20 and 25) were crossed in the same way, the corridor 50 for the tracks 16 and the workpieces 17, 18 would be substantially narrowed. To avoid this, lower arms 40 and 45 are elongated relative to the other lower arms, and legs 20 and 25 are uncrossed. That is, the bottom of leg 25 is mounted to lower arm 45 rather than to lower arm 40 (as would have been the case if the mounting pattern of legs 21–24 been followed). Similarly, the bottom of leg 20 is mounted to lower arm 40 rather than to lower arm 45. As a result, legs 20 and 25 extend away from each other. The space between the inboard points (mounting means 36) of legs 20 and 25 continues the corridor 50 for tracks 16.

Another preferred embodiment is shown in FIGS. 4–5. In it, the base 10 with lower arms 40–45 and spindle support 1 with upper arms 30–35 have been replaced by a base plate 10A and a spindle plate 11A. In addition, the slopes of legs 23 and 24 have been reversed relative to the slopes of those legs in the embodiment of FIGS. 1 through 3. That is, in the embodiment of FIGS. 4–5, leg 23 slopes downward toward the rear while in the embodiment of FIG. 1–3 leg 23 slopes downward toward the front. Similarly, in the embodiment of FIG. 4–5, leg 24 slopes downward toward the front while in the embodiment of FIGS. 1–3 leg 24 slopes downward toward the rear. This illustrates that the invention may be embodied in various orientations of legs.

Figure 9:
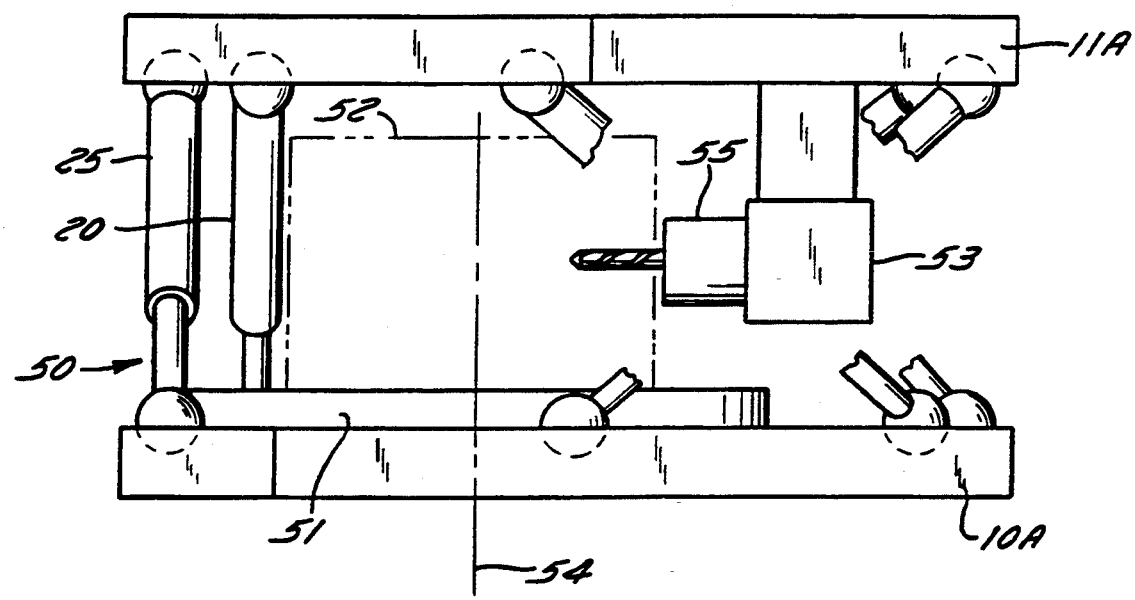
FIG. 9 is a side view in elevation of the embodiment of FIGS. 4 and 5 showing a rotary workpiece table and horizontal spindle assembly in place on the spaced supports.

It can be seen from FIGS. 4 and 5 that a corridor is formed having a wide entrance 50 defined by the uncrossed legs 20 and 25, and the corridor extends rearwardly toward the leg mounting means 46 for the legs 21 and 23 joined to the base plate 10A. A rotary workpiece table 51 can be mounted on the base plate 10A adjacent the wide entrance 50, as shown in FIG. 9. Such a location for the table 51 permits ease of access for loading and unloading a workpiece 52, and also accommodates the mounting of a spindle assembly 53 offset from the axis of rotation 54 of the rotary table 51. As shown in FIG. 9, the spindle assembly 53 can be mounted on the spindle plate 11A remote from the entrance 50 and may include a horizontal spindle 55 that can easily access all of the vertical sides of the workpiece 52 on the rotary table 51.

The legs 20–25 may be one or more of the types described in the incorporated patent documents, including hydraulically powered telescoping legs, legs employing a lead screw and rotating nut, ball screw driven powered legs with a moveable platform yoke assembly, legs adjustable by linear motors and chain drives, as well as other variable-length legs.

The leg mounting means 36, 46 may include any of the types described in the incorporated patent documents, including a trunnion-with-clevis joint (FIG. 6 herein), a universal joint (FIG. 7 herein), and a ball and socket joint (FIG. 8 herein), as well as other means providing the necessary degrees of motion.

The simultaneous manipulation of each of the legs 20–25 can achieve motion in all six axes—i.e., in a linear direction along each of the three orthagonal axes and rotary motion about each of those three axes.

Instrument arms and control schemes as described in the incorporated patent documents may be employed with the present invention.

Although the invention has been described in relation to machine tools, it is also useable in connection with any machine that requires that an operator be brought into position with respect to an object. It is also useful for a wide variety of tools other than the traditional cutting tool.

Although the preferred embodiments of the invention have been described above, the invention claimed is not so restricted. There may be various other modifications and changes to these embodiments which are within the scope of the invention.

We claim:

1. A machine tool for locating a tool relative to a workpiece, comprising the combination of:
    a pair of spaced supports, the tool being located with respect to one of the supports and the workpiece being located with respect to the other of the supports;
    six leg members with each leg member being joined at a first point to one of the supports and being joined to the other support at a second point that is spaced along the leg member from the first point;
    means for individually manipulating at least certain of the leg members to vary the position of the points of such leg members relative to each other;
    wherein the junctions of four of the leg members with the supports are located so that the four leg members are arranged into two pairs which are spaced apart to provide between the pairs a portion of a corridor for moving the workpiece into a working position and wherein at least one of the first and second pair of legs is crossed; and
    wherein the junctions of the other two leg members with the supports are located so that said other two leg members extend away from each other and provide another portion of the corridor between the inboard points of said other two leg members.

2. A machine tool for locating a tool relative to a workpiece, comprising the combination of:
    a pair of spaced supports, the tool being located with respect to one of the supports and the workpiece being located with respect to the other of the supports;
    six leg members with each leg member being joined at a first point to one of the supports and being joined to the other support at a second point that is spaced along the leg member from the first point;

means for individually manipulating at least certain of the leg members to vary the position of the points of such leg members relative to each other;

wherein the junctions of four of the leg members with the supports are located so that the four leg members are arranged into two pairs which are spaced apart to provide between the pairs a portion of a corridor for moving the workpiece into a working position;

wherein the junctions of the other two leg members with the supports are located so that said other two leg members extend away from each other and provide another portion of the corridor between the inboard points of said other two leg members; and wherein the leg members in each of the two pairs cross each other.

3. A machine tool for locating a tool relative to a workpiece, comprising:

a pair of spaced supports;

six leg members with each leg member being joined at a first point to one of the supports and being joined to the other support at a second point that is spaced along the leg member from the first point;

means for individually manipulating at least certain of the leg members to vary the position of the points of such leg members relative to each other;

the junctions of four of the leg members with the supports being located so that the four leg members are arranged into two pairs which are spaced apart to provide between the pairs a portion of a corridor for moving a workpiece into a working position;

the junctions of the other two leg members with the supports being located so that said other two leg members extend away from each other to provide an entrance to the corridor between the inboard points of said other two leg members;

a workpiece table mounted on one of the supports in the corridor and adjacent the entrance to the corridor; and a tool spindle assembly mounted on the other support and remote from the entrance.

4. A mechanism for locating an operator relative to an object, comprising the combination of:

an operator support and an object support spaced from each other;

six leg members, with each leg member being joined at one point to one of the supports and being operatively connected to the other support at another point that is spaced along the leg member from the one point;

means for individually manipulating at least certain of the leg members to vary the position of the points of such leg members relative to each other to thereby alter the position of the operator with respect to the object;

wherein the junctions of four of the leg members with the supports are located so that the four leg members are arranged into two pairs which are spaced apart to provide between the pairs a portion of a corridor for moving the object into a working position;

wherein the junctions of the other two leg members with the supports are located so that said other two leg members extend apart form each other and provide another portion of the corridor between the inboard points of said other two leg members; and wherein the leg members in each of the two pairs cross each other.

5. A machine tool in accordance with claim 3 wherein the workpiece table is a rotary table and the tool spindle assembly includes a spindle having an axis that is transverse to the axis of rotation of the rotary table.

6. In a machine tool, the combination comprising:

a first platform adapted to mount a tool;

a second platform adapted to mount a workpiece;

six linearly extensible legs, each pivotally mounted adjacent one end to the first platform and each pivotally mounted adjacent the other end to the second platform;

means for individually varying the length of each leg to alter the position of the first platform and the tool with respect to the second platform and the workpiece:

wherein the mountings of four of the legs with the platforms are located so that the four legs are arranged into two pairs which are spaced apart to provide between the pairs a portion of a corridor for moving the workpiece into a working position;

wherein the mountings of the other two legs with the platforms are located so that said other two legs extend away from each other and provide another portion of the corridor between the inboard mountings of said other two legs; and wherein the legs in each of the two pairs cross each other.

7. A mechanism for joining spaced platforms, comprising:

six legs connecting the platforms together, each of the legs being joined at one point to one of the platforms and being operatively connected to the other platform at another point that is spaced from the one point;

means for individually manipulating at least certain of the legs to vary the positions of the points of such legs relative to each other to thereby alter the position of the platforms with respect to each other;

wherein the junctions of four of the legs with the platforms are located so that the four legs are arranged into two pairs which are spaced apart to provide between the pairs a portion of a corridor between the platforms and at least one of the pairs of legs is crossed; and wherein the junctions of the other two legs with the platforms are located so that said other two legs extend away from each other and provide another portion of the corridor between the inboard points of said other two legs.

8. A mechanism for joining spaced platforms, comprising:

six legs connecting the platforms together, each of the legs being joined at one point to one of the platforms and being operatively connected to the other platform at another point that is spaced from the one point;

means for individually manipulating at least certain of the legs to vary the positions of the points of such legs relative to each other to thereby alter the position of the platforms with respect to each other;

wherein the junctions of four of the legs with the platforms are located so that the four legs are arranged into two pairs which are spaced apart to provide between the pairs a portion of a corridor between the platforms;

wherein the junctions of the other two legs with the platforms are located so that said other two legs extend away from each other and provide another portion of the corridor between the inboard points of said other two legs; and wherein the legs in each pair cross each other.

9. An apparatus for locating an operator relative to an object, comprising:

a first support structure configured to rigidly hold the operator;

a second support structure configured to rigidly hold the object;

a plurality of legs connecting the first support structure to the second support structure, each individual leg being connected to the first and second support structures by a first and second pivotable joint, respectively, the plurality of legs being individually extensible and retractable and arranged to create a corridor providing access to the object, wherein a first pair of legs is disposed generally on a first side of the corridor, a second pair of legs is disposed generally on a second side of the corridor, and a third pair of legs has a single leg disposed on each side of the corridor; and wherein at least one of the first and second pair of legs is crossed.

10. The apparatus of claim 9, wherein each leg comprises a ball screw.

11. The apparatus of claim 9, wherein the first pair of legs is crossed and the second pair of legs is crossed.

* * * * *